March 3, 1931.  J. OVENS  1,794,729
DEVICE FOR SHOWING THE NAMES OF THE STREETS OR STOPS
Filed Sept. 2, 1927  3 Sheets-Sheet 1
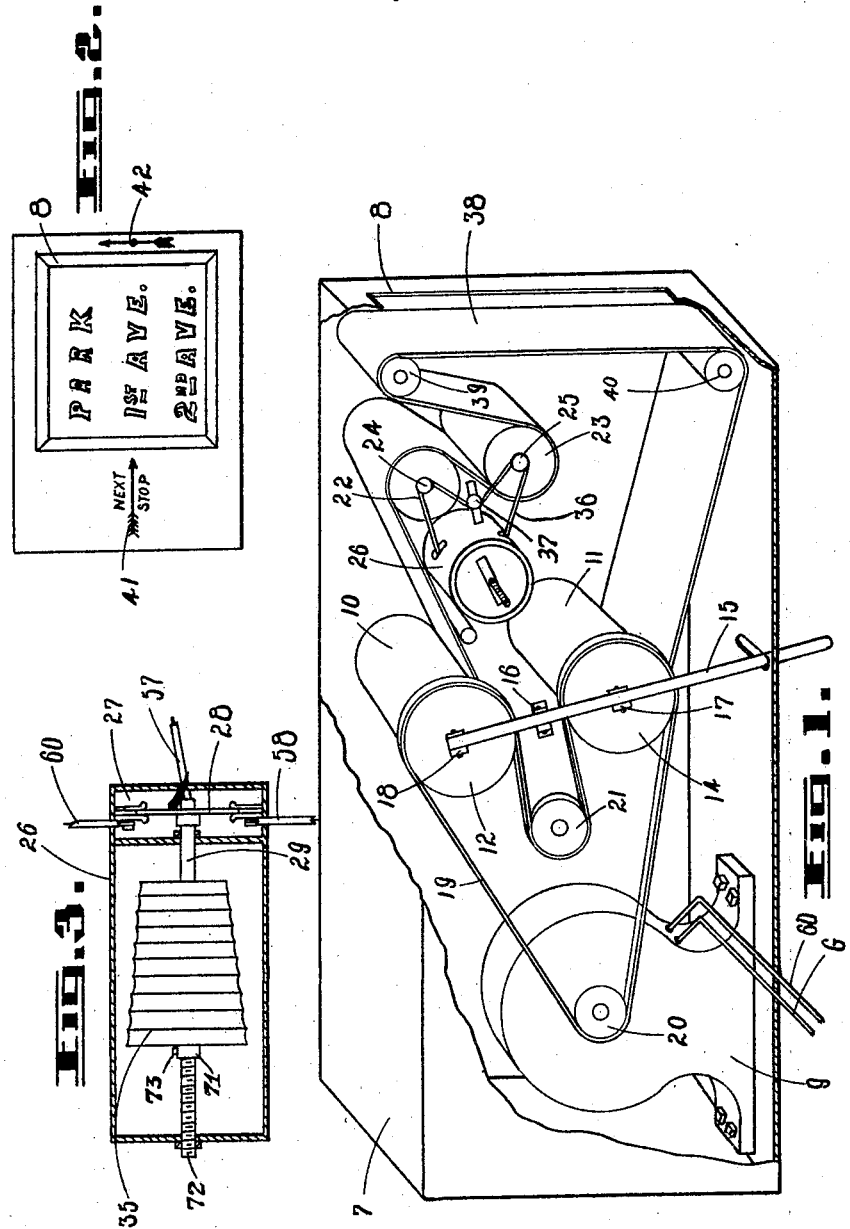
JAMES OVENS,
INVENTOR.
BY *Harold C. Shipman*
ATTORNEY.

March 3, 1931. J. OVENS 1,794,729
DEVICE FOR SHOWING THE NAMES OF THE STREETS OR STOPS
Filed Sept. 2, 1927   3 Sheets-Sheet 2
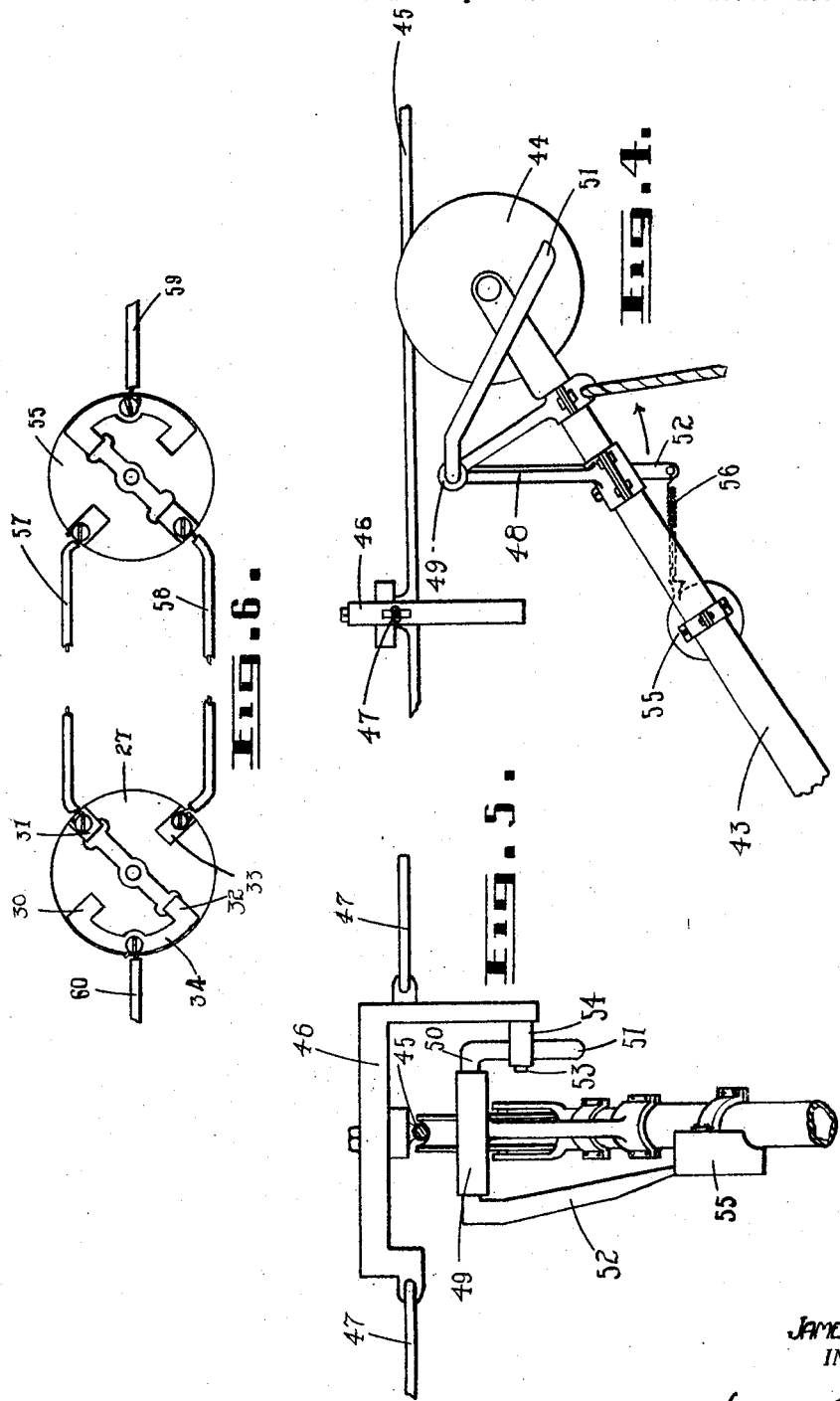
JAMES OVENS.
INVENTOR.
BY *Harold C. Shipman*
ATTORNEYS.

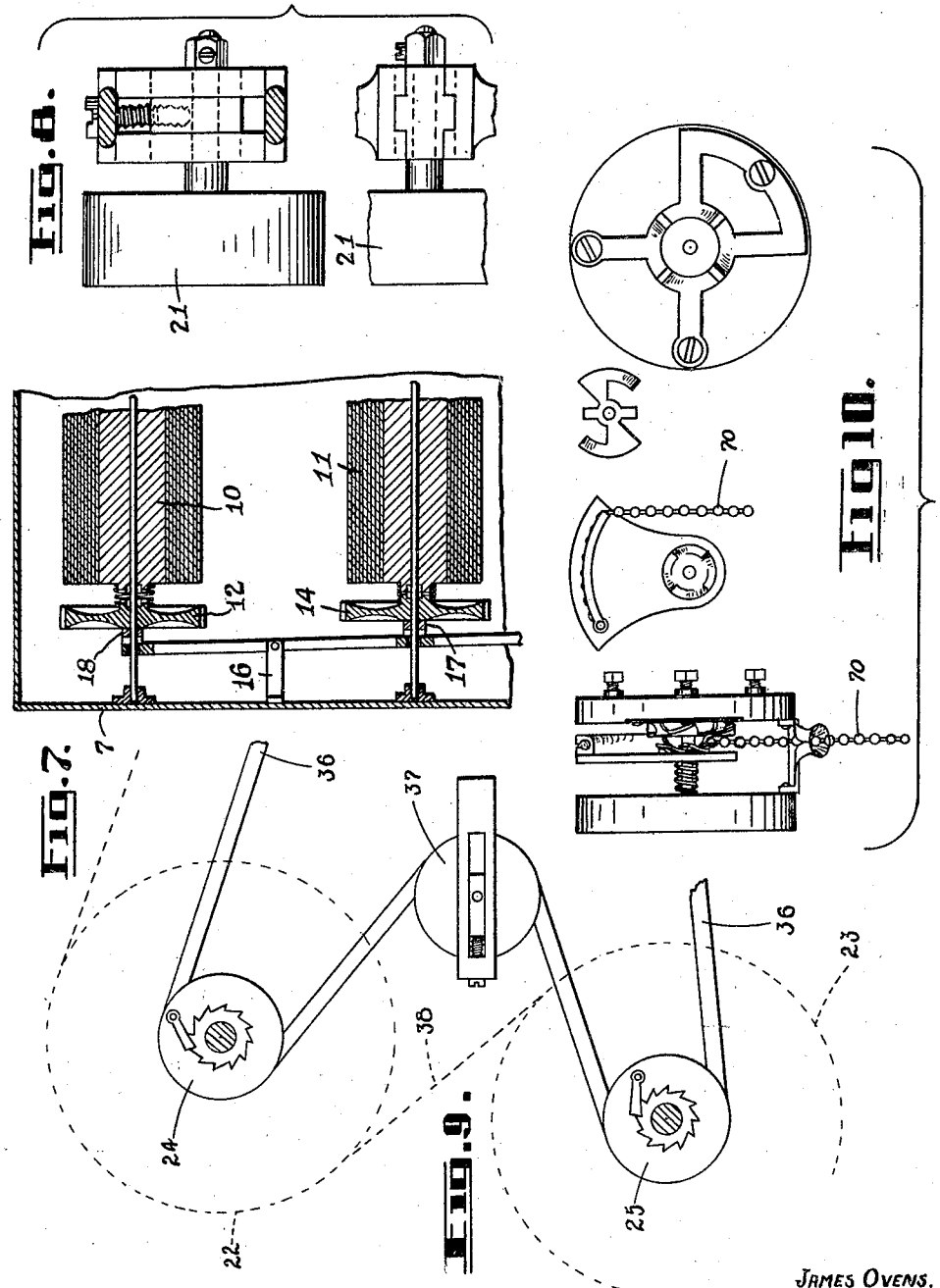

Patented Mar. 3, 1931

1,794,729

UNITED STATES PATENT OFFICE

JAMES OVENS, OF TORONTO, ONTARIO, CANADA

DEVICE FOR SHOWING THE NAMES OF THE STREETS OR STOPS

Application filed September 2, 1927. Serial No. 217,162.

This invention relates to a device for showing the names of the streets or stops, and particularly for use in connection with tramways. The construction provides the showing of a grouping of streets in such a manner that a visual indication of the street or stop just having been passed, the street or stop next coming and the succeeding street or stop, will appear so that the person may easily realize the streets or stops as they are approached and are passed.

The object of my invention is to facilitate travel and to render a machine of simple construction with parts readily accessible for inspection and repair.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a perspective view of the preferred embodiment of my invention, part of the casing broken away so as to more clearly illustrate the features of my construction.

Fig. 2 is a front plan view of the end of the casing showing the vision opening through which the indication strip appears.

Fig. 3 is a detail view of one of the switch control members.

Fig. 4 is a side plan view of my trip control.

Fig. 5 is a front plan view of my trip control, and

Fig. 6 is a schematic illustration of the coacting switches and their connection.

Fig. 7 is a detail view of the rollers, showing the clutch members of the reversing mechanism.

Fig. 8 is an enlarged detail view showing the adjustable mounting for the adjustment pulley.

Fig. 9 is an enlarged detail view of the ratchet connection viewed from the side opposite to that shown in Fig. 1.

Fig. 10 is an enlarged detail view showing the internal structure of one of the control switches.

Like numerals of reference designate corresponding parts throughout the different views.

7 is a casing of any suitable size adapted for supporting and encasing certain of the moving parts hereinafter described. This casing is provided at one end with a vision opening 8, the purpose of which will be hereinafter mentioned. 9 is a motor mounted in the casing 7. 10 and 11 are spaced apart rollers, having a suitable mounted connection with the casing. At the end of each of the respective rollers 10 and 11, I provide a clutch member 12 and 14, which clutch members are controlled by the lever 15, fulcrumed on the bearing 16. The lever has suitable connections as at 17 to the clutch member 14 and as at 18 to the clutch member 12. On moving this lever 15 on its fulcrumed point 16, the clutch member 12 may be thrown out of operable connection with the roller 10. Simultaneously with this operation, the clutch member 14 will be thrown into operable connection with the roller 11 or vice versa. The clutch members 12 and 14 are provided, on their outer circumference, with a surface over which the belt 19 is trained. This belt also extends around the drive pulley 20 of the motor 9 and around the idler pulley 21, which pulley is so mounted in a block suitably supported from the casing 7 as to be adjusted for controlling the tightening of the belt 19 as may be desired.

22 and 23 are rollers suitably mounted in the casing 7 and provided with pulleys 24 and 25. The pulleys are not fastened solid to the shafts on which the rollers 22 and 23 are mounted, but each have a ratchet connection to their respective shafts, so that the respective pulley will turn only when its respective roller is turned in the desired direction, while the other pulley will be idle.

26 is a casing, having a switch compartment 27. 28 is a knife switch carried on the inner end of the shaft 29. Mounted on the inner contour of the switch compartment 27 are four contact points, 30, 31, 32 and 33, the contact points 30 and 32 being provided with a joining buss bar 34. 35 is frusto-conical-shaped pulley having a series of annular grooves thereon which vary in size according to their position on the outer contour of the frusto-conical pulley 35. This frusto-conical-shaped pulley is mounted on the shaft 29. The end bearing 71 of the frusto-conical-shaped pulley 35 is interiorly threaded, which threading operates in conjunction with the threaded portion 72 of the shaft 29 when it is found necessary to move the pulley 35 in either direction, the setscrew 73 being designed to retain it in its fixed relationship under normal conditions. 36 is a flexible connection trained over the pulley 35 and the pulleys 24 and 25. 37 is an idler pulley adjustably mounted for taking up the slack in the flexible connection 36. In designing these pulleys 24, 25 and 35, the outer circumference of the pulleys 24 and 25 will be of the same size, while the circumference of the averaged groove on the pulley 35, will be at a ratio of 4 to 1 in regard to the circumference of the pulleys 24 and 25.

38 is the street or stop indication belt, having the streets or stops printed on one side in proper order. 39 and 40 are idler rollers, suitably supported in the casing 7 so as to properly position the portion of the belt 38 opposite the vision opening 8. One end of this street or stop indication belt 38 is secured to the roller 10. The belt is trained over the roller 22, back around the roller 23, up over the roller 39, down around the roller 40 and the other end is attached to the roller 11. It will be noted that the belt 38 is trained over the rollers 22 and 23, so as to rotate them in opposite directions, while the ends of the belt are attached to the roller 10 and 11, so that the belt will be wound up on these rollers in the same direction.

On the front of the casing 7, provided with the vision opening 8, it will be noted that three of the streets appear. If desired on the outer face of this end, an indication arrow with wording such as at 41 may be placed, so as to show that the centre name is the next stop or street at which the tramway will stop. On the opposite side of the vision opening 8, a pivotal mounted arrow 42 may be positioned, which will be turned to show the direction in which the belt 38 is travelling.

43 is a trolley pole having the usual trolley wheel 44 tensioned against the trolley line 45. At each stop along the route of travel, I provide a bracket 46 which is suitably supported by the guy wires 47 and at this point, the trolley line 45 is supported from the bracket 46. Suitably mounted on the trolley pole 43 is a bracket 48 provided with an annular bearing 49 at its upper end. 50 is a shaft extending through the bearing 49 and provided at one end with a trip arm 51. At the other end, I provide a downwardly extended arm 52, the purpose of which will hereinafter be mentioned. One end of the bracket 46 is provided with an outwardly extended stub shaft 53, on which a suitable roller 54 is mounted. The position of this roller is so designed that when the trolley pole 43 is carried past the bracket 46, the trip arm 51 will engage over the roller 54, which roller 54 will cause the free end of the trip arm 51 to swing upwardly, which will cause the free end of the arm 52 to swing rearwardly as indicated by the arrow shown in Fig. 4.

55 is a chain control switch suitably mounted on the trolley pole 43 and operated by means of having its chain connected to a spring 56, which spring is connected to the free end of the arm 52. This chain control switch 55 is of ordinary construction and coacts with the switch in the compartment 27. The principle involved of co-acting switches of this nature is well-known to the art as double throw rotary switches and it is not considered necessary that a full description of the details of the switches will be necessary.

In Fig. 10 the switch 55 is shown in detail the chain pulling member 70 being attached to the spring 56 as shown in Fig. 4. I do not wish to be limited to the interior construction of this switch, as many different principles of double throw rotary switches are on the open market and can be adapted for use in connection with my construction. When the contact blade of the switch 55 is in the position as shown in Fig. 6, the current flow to the motor 9 is cut off. When the car in which my device is mounted comes to the next intersection, the trip arm 51 will contact with the roller 54 and be moved thereby, which will cause the pull member 70 to be pulled out and throw the contact blade of the switch 55 a one quarter turn, which will connect the circuit from the wire 59, through the contact blade of the switch 55, through the wire 57, through the contact blade in the switch 27 and through the wire 60 to the motor 9.

The rollers 22 and 23, with their ratchet pulleys 24 and 25, are turned by the belt 38 which is trained over the same. Only one of the pulleys 24 or 25 will be in operative relationship to its respective roller by its ratchet connection, while the other pulley will turn as an idler. The rollers 22 and 23 are designed of a size that they will make one complete revolution while carrying the belt 38 on to show the next succeeding stop indication. The flexible connection 36 carried over the pulleys 24 and 25 will turn the frusto-conical pulley 35 one-quarter turn, in view of the ratio between these pulleys, which will throw the knife switch 28 a one-quarter turn. 57 and 58 are the wire connections between the switch 55 and the contact points in the switch compartment 27. 59 is the wire connection to a suitable source of supply, such as the trolley pole 43. 60 is the wire connection from the buss bar in the switch compartment 27 to the motor 9. The motor 9 may be grounded on the neutral side in a like manner to that of other motors used in tramway vehicles.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

1. An indicator comprising a casing; a vision opening in said casing; a pair of rollers mounted in said casing; an indicia belt, the ends of which are respectively connected to said rollers and said belt adapted to be wound from one to the other of said rollers, with a portion of said belt trained to register opposite said vision opening; shafts each supporting a respective roller, belt pulleys each carried on a respective shaft and rotatable independently of the roller on said shaft, a motor, a belt driven by said motor and extending around both of said belt pulleys, an idler pulley around which said belt passes between its point of engagement with the belt pulleys, cooperating clutch members on said rollers and belt pulleys, and a shipper lever pivoted intermediate its ends between said belt pulleys and engaging the same to simultaneously engage one belt pulley with its roller and disengage the other belt pulley from its roller.

2. An indicator for cars comprising a casing; a vision opening in said casing; a pair of rollers mounted in said casing; an indicia belt, the ends of which are respectively connected to said rollers and said belt adapted to be wound from one to the other of said rollers, with a portion of said belt trained to register opposite said vision opening; a switch in said casing, a shaft operating said switch, a cone pulley on said shaft, means to secure the cone pulley in adjusted position on said shaft, a pulley driven by said belt, a switch actuating belt connecting said belt pulley and said cone pulley; a switch mounted exteriorly of said casing; a trip means for operating said last mentioned switch; means positioned at pre-determined intervals apart for actuating said trip means; conductors, adapted to be alternately energized upon actuation of last said switch to complete a circuit for causing the movement of said rollers, which circuit is broken upon actuation of first said switch when said belt has travelled a pre-determined distance and a means for reversing the direction of travel of said belt.

In testimony whereof, I affix my signature.

JAMES OVENS.